US008953756B2

(12) United States Patent
Berstis et al.

(10) Patent No.: US 8,953,756 B2
(45) Date of Patent: Feb. 10, 2015

(54) CHECKING FOR PERMISSION TO RECORD VOIP MESSAGES

(75) Inventors: Viktors Berstis, Austin, TX (US); Randolph M. Forlenza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 11/456,500

(22) Filed: Jul. 10, 2006

(65) Prior Publication Data
US 2008/0037725 A1 Feb. 14, 2008

(51) Int. Cl.
*H04M 1/64* (2006.01)
*H04M 3/42* (2006.01)
*H04L 29/06* (2006.01)

(52) U.S. Cl.
CPC ....... *H04M 3/42221* (2013.01); *H04L 65/1073* (2013.01)
USPC .......................... 379/88.17; 370/352; 370/354

(58) Field of Classification Search
USPC ............... 370/352, 401, 354; 379/67.1, 88.17
See application file for complete search history.

(56) References Cited

U.S. PATENT DOCUMENTS

| 4,468,813 A | 8/1984 | Burke et al. |
|---|---|---|
| 5,146,502 A | 9/1992 | Davis |
| 5,699,409 A | 12/1997 | Kojima |
| 5,990,933 A | 11/1999 | Ozone et al. |
| 6,058,389 A | 5/2000 | Chandra et al. |
| 6,353,660 B1 | 3/2002 | Burger et al. |
| 6,865,398 B2 | 3/2005 | Mangal et al. |
| 6,925,605 B2 | 8/2005 | Bates et al. |
| 7,007,085 B1 | 2/2006 | Malik |
| 7,032,030 B1 | 4/2006 | Codignotto |

(Continued)

FOREIGN PATENT DOCUMENTS

| DE | 4138886 C | 4/1993 |
|---|---|---|
| DE | 4324573 C | 10/1994 |

(Continued)

OTHER PUBLICATIONS http://www.google.com/talk/, "Google Talk-Talk and IM with your friends for free," p.-1.

(Continued)

*Primary Examiner* — Simon King
(74) *Attorney, Agent, or Firm* — Garg Law Firm, PLLC; Rakesh Garg; Mark C. Vallone (57) ABSTRACT

Methods and arrangements to check for permission to record Voice over Internet Protocol (VoIP) messages and to respond to requests for permission are contemplated. Embodiments include transformations, code, state machines or other logic to check for permission to record VoIP messages and to respond to requests by transmitting an inquiry on permission to record a VoIP message of a participant in a VoIP call session comprising the VoIP message, receiving a response to the inquiry, determining by a processor whether the response to the inquiry grants permission to record the VoIP message, and recording the VoIP message based upon the response to the inquiry granting permission to record the VoIP message. Some embodiments may involve querying a participant in a VoIP call session comprising a VoIP message for permission to record the VoIP message through a user interface mechanism for checking for permission to record VoIP messages.

14 Claims, 6 Drawing Sheets

(56) References Cited

U.S. PATENT DOCUMENTS

| | | |
|---|---|---|
| 7,123,695 B2 | 10/2006 | Malik |
| 7,243,060 B2 | 7/2007 | Atlas et al. |
| 7,599,354 B2 | 10/2009 | Bratt et al. |
| 7,716,479 B2 | 5/2010 | Vargas et al. |
| 7,738,638 B1* | 6/2010 | Henderson ............... 379/88.17 |
| 7,856,088 B2 | 12/2010 | Janssen |
| 7,869,579 B2 | 1/2011 | Kwon |
| 8,503,622 B2 | 8/2013 | Berstis et al. |
| 2001/0012286 A1 | 8/2001 | Huna et al. |
| 2002/0032870 A1 | 3/2002 | Spusta et al. |
| 2002/0039916 A1* | 4/2002 | Hosoi ........................ 455/572 |
| 2003/0035412 A1 | 2/2003 | Wang et al. |
| 2003/0212553 A1 | 11/2003 | Tsoi et al. |
| 2003/0215078 A1 | 11/2003 | Brahm et al. |
| 2003/0219104 A1 | 11/2003 | Malik |
| 2003/0235407 A1 | 12/2003 | Lord |
| 2004/0001482 A1 | 1/2004 | Yeom |
| 2004/0109023 A1 | 6/2004 | Tsuchiya |
| 2004/0186887 A1 | 9/2004 | Galli et al. |
| 2004/0225502 A1 | 11/2004 | Bear et al. |
| 2005/0027802 A1 | 2/2005 | Madsen et al. |
| 2005/0041786 A1 | 2/2005 | Craig |
| 2005/0107071 A1 | 5/2005 | Benco et al. |
| 2005/0144247 A1 | 6/2005 | Christensen et al. |
| 2005/0159833 A1 | 7/2005 | Giaimo et al. |
| 2005/0209932 A1 | 9/2005 | Hui |
| 2005/0210394 A1 | 9/2005 | Crandall et al. |
| 2005/0259638 A1 | 11/2005 | Burg |
| 2006/0010222 A1 | 1/2006 | Cleron et al. |
| 2006/0029195 A1 | 2/2006 | Mullis et al. |
| 2006/0174207 A1 | 8/2006 | Deshpande |
| 2006/0212291 A1 | 9/2006 | Matsuo |
| 2006/0256771 A1 | 11/2006 | Yarlagadda |
| 2006/0291580 A1 | 12/2006 | Horvitz |
| 2007/0036292 A1 | 2/2007 | Selbie et al. |
| 2007/0071206 A1 | 3/2007 | Gainsboro et al. |
| 2007/0083772 A1* | 4/2007 | Harada et al. ................. 713/193 |
| 2007/0112925 A1 | 5/2007 | Malik |
| 2007/0121966 A1 | 5/2007 | Plastina et al. |
| 2007/0147207 A1* | 6/2007 | Sako et al. ................. 369/53.31 |
| 2007/0192427 A1 | 8/2007 | Berstis et al. |
| 2007/0274293 A1* | 11/2007 | Forbes .......................... 370/352 |
| 2007/0299657 A1 | 12/2007 | Kand et al. |
| 2008/0065735 A1 | 3/2008 | Szeto et al. |
| 2008/0069310 A1 | 3/2008 | Berstis et al. |
| 2008/0107045 A1 | 5/2008 | Berstis et al. |
| 2008/0222536 A1 | 9/2008 | Berstis et al. |

FOREIGN PATENT DOCUMENTS

| | | |
|---|---|---|
| DE | 19715225 A | 10/1998 |
| EP | 1039728 A1 | 9/2000 |

OTHER PUBLICATIONS

ICQ., "ICQ: Voice Message—Plugin", May 8, 1999.
Rose Vines, "ICQ: a user's guide", Dec. 19, 2002.
ICQ, "ICQ: The User Menu", Aug. 15, 2000.
U.S. Appl. No. 11/355,641, Sep. 4, 2008 Non-Final Rejection.
U.S. Appl. No. 12/126,837, Jul. 8, 2009 Non-Final Rejection.
U.S. Appl. No. 12/126,837, Dec. 29, 2009 Non-Final Rejection.
U.S. Appl. No. 12/126,837, Jun. 4, 2010 Final Rejection.
U.S. Appl. No. 12/126,837, Mar. 31, 2011 Non-Final Rejection.
U.S. Appl. No. 12/126,837, Jun. 8, 2011 Final Rejection.
U.S. Appl. No. 12/126,837, Mar. 20, 2014 Notice of Allowance and Fees Due.
U.S. Appl. No. 12/126,837, May 15, 2014 Notice of Allowance and Fees Due.
U.S. Appl. No. 11/532,118, Feb. 25, 2011 Non-Final Rejection.
U.S. Appl. No. 11/532,118, Jul. 10, 2012 Final Rejection.
U.S. Appl. No. 11/532,118, Dec. 26, 2012 Notice of Allowance and Fees Due.
U.S. Appl. No. 11/532,118, Apr. 2, 2013 Notice of Allowance and Fees Due.
U.S. Appl. No. 11/555,744, Feb. 8, 2011 Non-Final Rejection.
U.S. Appl. No. 11/555,744, May 3, 2011 Non-Final Rejection.

* cited by examiner

CHECKING FOR PERMISSION TO RECORD VOIP MESSAGES

FIELD

The present invention is in the Field of the audio communications over a network. More particularly, the present invention relates to methods and arrangements to check for permission to record Voice over Internet Protocol (VoIP) conversations and to respond to inquiries for permission.

BACKGROUND

Voice over Internet Protocol (VoIP) is a method for the real-time exchange of speech and other audio over the Internet and other networks. Audio may be converted into digital form, broken up into units of data called packets, and transmitted across a network. Upon receipt, the packets are assembled, and the audio may be converted from digital form to analog form and played.

VoIP calls may be made by several methods. In one method, a call is placed from a standard telephone which is connected to a computer with an analog telephone adapter. The adapter converts sound into digital form for transmission over a network. In a second method, a call is made form an IP phone. The IP phone may convert audio to digital form. The Ip phone may connect directly to an Ethernet port for transmission of the digital audio across a network. A third method is from a computer. The computer may include equipment for processing sound, such as a microphone to capture sound, a sound card to convert the sound to digital form, and speakers to play the sound. The computer may be connected to a network for transmission of the sound.

VoIP calls may be made in several settings. A VoIP call may be limited to one participant at each end. A VoIP call may be a conference call, with multiple participants. In addition, a VoIP call may be part of a chat conference. Chat conferences are the real-time exchange of text among groups of people.

It may be desirable to obtain permission to record VoIP calls. Obtaining permission may be demanded by the law or suggested by civility. In some US jurisdictions, it may be illegal to record a call without obtaining the proper permission. In addition, a participant in a VoIP call may become angered upon learning that a message originated by the participant was recorded without permission. Current VoIP systems may provide little or no aid in controlling the recording of VoIP messages based upon permission to record the messages. They may leave it up to participants to generate requests for permission to record VoIP messages. They may not provide restrictions on recording VoIP messages when permission to record has not been obtained.

SUMMARY OF THE INVENTION

The problems identified above are in large part addressed by methods and arrangements to check for permission to record Voice over Internet Protocol (VoIP) messages and to respond to inquiries for permission. One embodiment provides a method to check for permission to record Voice over Internet Protocol (VoIP) messages. The method may involve transmitting an inquiry on permission to record a VoIP message of a participant in a VoIP call session comprising the VoIP message, receiving a response to the inquiry, determining by a processor whether the response to the inquiry grants permission to record the VoIP message, and recording the VoIP message based upon the response to the inquiry granting permission to record the VoIP message.

Another embodiment provides a method to generate responses to requests for permission to record VoIP messages. The method may involve receiving an inquiry for the permission of a participant in a VoIP call session comprising a VoIP message to record the VoIP message. The method may also involve querying the participant for permission to record the VoIP message through a user interface mechanism for checking for permission to record VoIP messages. The method may also involve receiving a reply from the participant, generating a response to the inquiry on permission to record the VoIP message based upon the reply from the participant and transmitting the response. Other embodiments provide an apparatus and machine-accessible medium to check for permission to record VoIP messages and to respond to requests for permission.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to check for permission to record Voice over Internet Protocol (VoIP) messages and to respond to requests for permission are contemplated. Embodiments include transformations, code, state machines or other logic to check for permission to record Voice over Internet Protocol (VoIP) messages and to respond to requests for permission by transmitting an inquiry on permission to record a VoIP message of a participant in a VoIP call session comprising the VoIP message, receiving a response to the inquiry, determining by a processor whether the response to the inquiry grants permission to record the VoIP message, and recording the VoIP message based upon the response to the inquiry granting permission to record the VoIP message. Some embodiments may involve receiving an inquiry for the permission of a participant in a VoIP call session comprising a VoIP message to record the VoIP message. The embodiments may also involve querying the participant for permission to record the VoIP message through a user interface mechanism for checking for permission to record VoIP messages. The embodiments may also involve receiving a reply from the participant, generating a response to the inquiry on permission to record the VoIP message based upon the reply from the participant, and transmitting the response.

While specific embodiments will be described below with reference to particular circuit or logic configurations, those of skill in the art will realize that embodiments of the present invention may advantageously be implemented with other substantially equivalent configurations.

Figure 1:
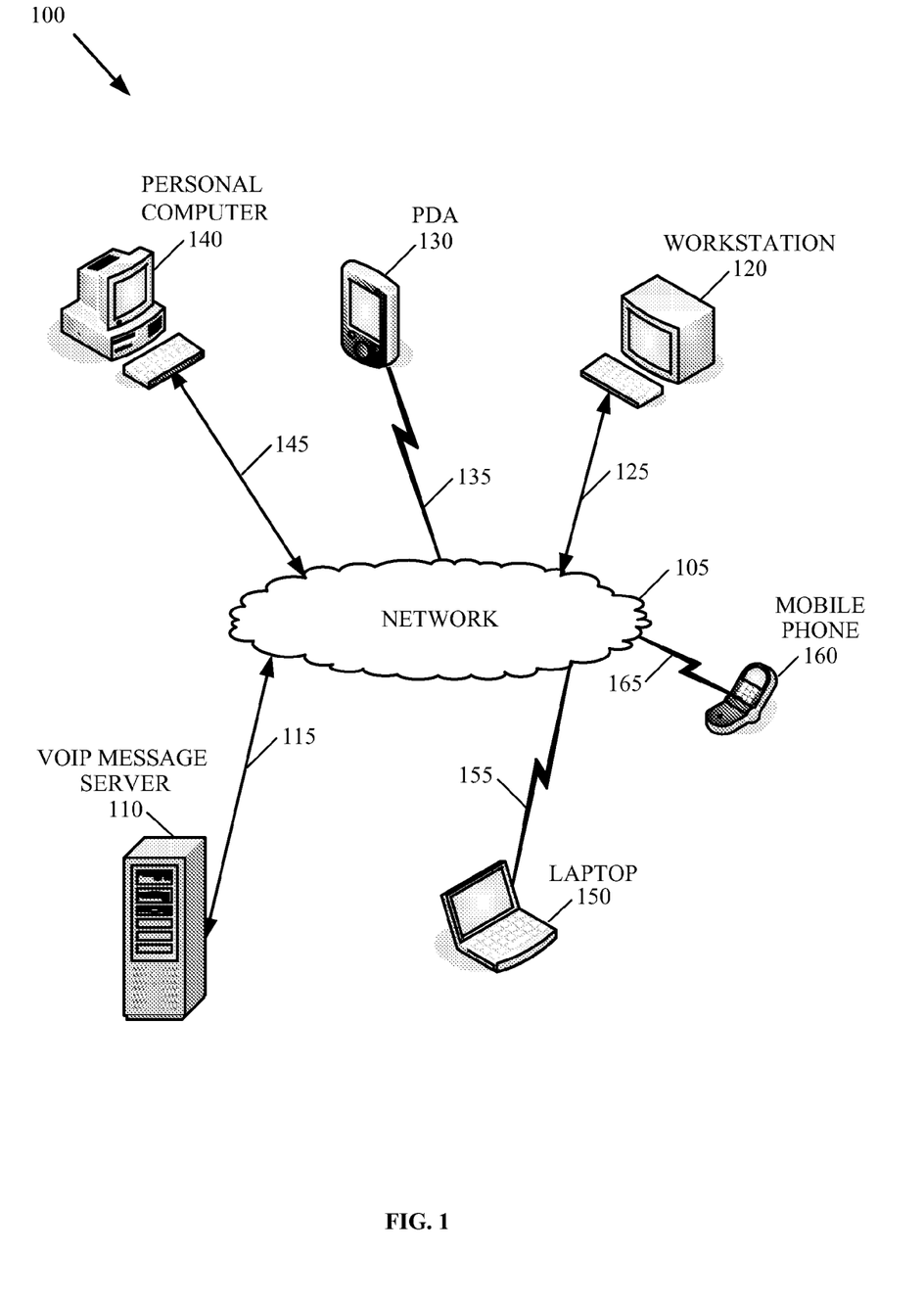
FIG. 1 depicts a network diagram of an embodiment of devices capable of checking for permission to record Voice over Internet Protocol (VoIP) VoIP messages.

FIG. 1 depicts a diagram of an embodiment of a networked system 100 of devices capable of checking for permission to record VoIP messages. Networked system 100 may provide for the real-time exchange of speech and other audio over the Internet and other networks. The system 100 includes a network 105, VoIP message server 110 connected to network 105 through wireline connection 115, and a variety of devices capable of checking for permission to record VoIP messages (VoIP devices), including:

workstation 120, a computer coupled to network 105 through wireline connection 125, personal digital assistant (PDA) 130, coupled to network 105 through wireless connection 135, personal computer 140, coupled to network 105 through wireline connection 145, laptop computer 150, coupled to network 105 through wireless connection 155; and mobile phone 160, coupled to network 105 through wireless connection 165.

Network 105, which may consist of the Internet or another wide area network, a local area network, or a combination of networks, may provide data communications among the VoIP message server 110 and the VoIP devices 120, 130, 140, 150, and 160. VoIP message server 110 may have software to transmit VoIP messages across network 105 installed and operative upon it. VoIP message server 110 may receive requests to make VoIP calls. For example, VoIP message server 10 may receive digital data representing a telephone number. VoIP message server 110 may determine that the request to make a VoIP call is in proper format, and may determine an IP address for a recipient or recipients. VoIP message server 110 may establish a virtual connection between the device placing the VoIP call and a destination device, thereby establishing a VoIP call session. During the course of a VoIP call session, a series of VoIP calls may be placed back and forth between the participants. In other embodiments, VoIP messages may be transmitted without a server such as VoIP message server 10.

Users may participate in VoIP conversations through VoIP devices such as devices 120, 130, 140, 150, and 160. The VoIP devices such as devices 120, 130, 140, 150, and 160 may also be capable of automatically checking for permission to record VoIP calls and may contain processors which receive responses to the requests for permission and determine whether the responses grant permission to record the VoIP calls. In some embodiments, the VoIP devices such as devices 120, 130, 140, 150, and 160 may run client software. When a participant opens client software, the client may attempt to connect with VoIP message server 110. If the connection is successful, the client may inform the VoIP message server 110 of the participant's Internet Protocol (IP) address, a number identifying the VoIP device, and the number of a port assigned to the client. In some further embodiments, the client software may both transmit the requests for permission to record VoIP messages and the responses to the requests for permission to record VoIP messages. In other further embodiments, some client software may transmit the requests for permission to record VoIP messages and other client software may transmit the responses to the requests for permission to record VoIP messages.

In other embodiments, a participant may visit a web site to participate in a VoIP call. No client software may reside on the participant's VoIP device. In these embodiments, the requests for permission to record VoIP messages and the responses to the requests for permission to record VoIP messages may be transmitted other than by client software.

In some embodiments, a VoIP message may be transmitted across the network 105 to the VoIP message server 110 and may be relayed to the other participants by VoIP message server 110. In other embodiments, the VoIP message may be transmitted from one participant to others without being relayed through the VoIP message server 110. A client running on a participant's VoIP device may obtain connection information such as IP addresses and ports from the VoIP message server 110.

The VoIP messages may be sent under a variety of protocols, or methods for bundling up the digital content and transmitting the digital content across network 105. When a client sending a VoIP message sends it by a protocol understood by the client receiving the VoIP message, the receiving client may understand the format of the VoIP message and the manner in which the VoIP message was sent across the network 105, and may be able to properly process it. Protocols for transmitting VoIP across a network such as network 105 include H.323, a standard created for multimedia data including audio and video by the International Telecommunication Union (ITU); Media Gateway Control Protocol (MGCP); and Session Initiation Protocol (SIP).

The arrangement of the VoIP message server 110 and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill ill the art. Various embodiments of the present invention may be implemented on a variety of hardware platforms in addition to those illustrated in FIG. 1.

Figure 2:
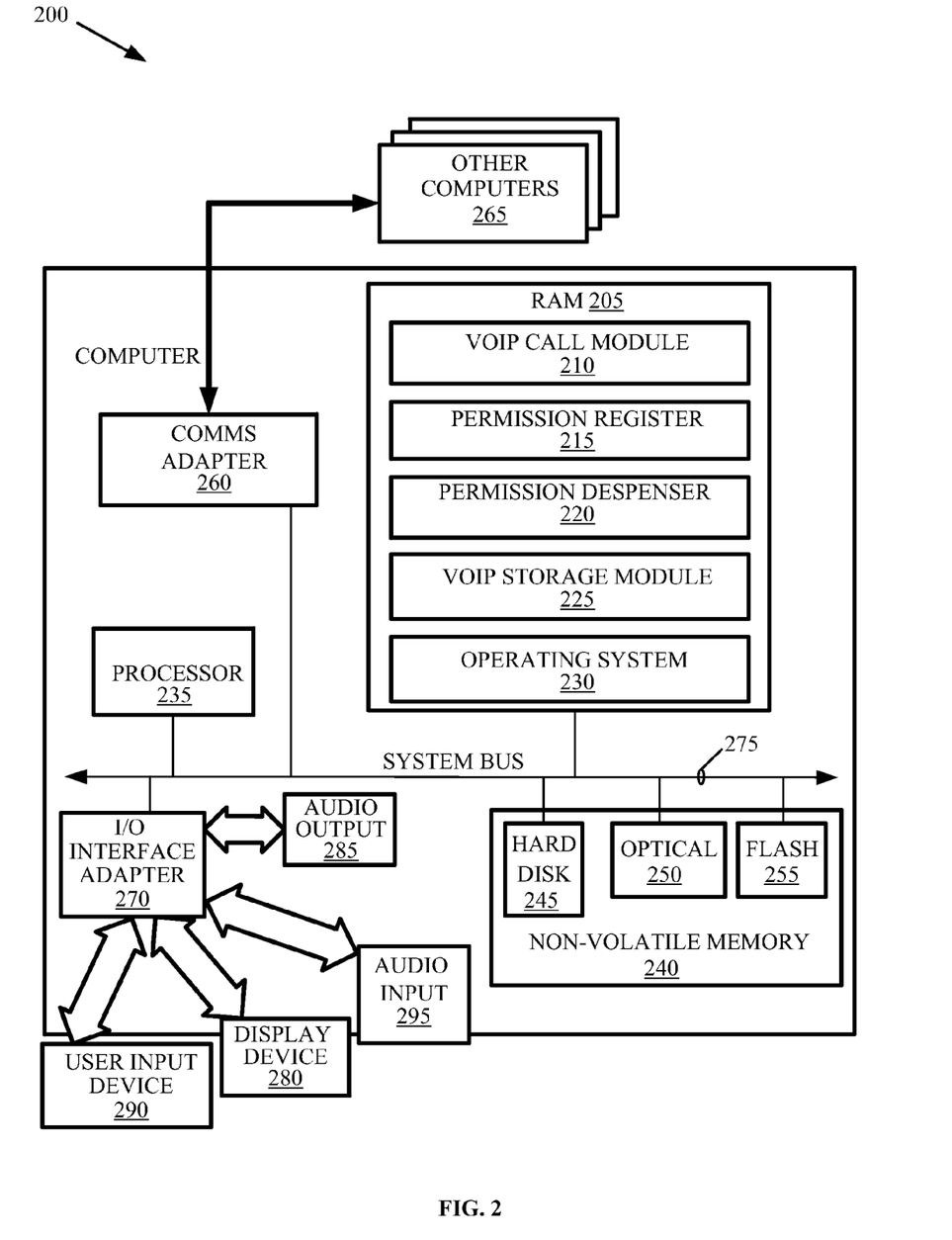
FIG. 2 depicts an embodiment of a computer capable of checking for permission to record VoIP messages.

Turning to FIG. 2, depicted is an embodiment of a computer 200 capable of checking for permission to record VoIP messages that includes random access memory (RAM) 205, a processor 235 or CPU, non-volatile memory 240, a communications adapter 260, and an Input/Output (I/O) interface adapter 270 connected by system bus 275. Stored in RAM 205 are a VoIP call module 210, a permission requestor 215, a permission dispenser 220, a VoIP storage module 225, and an operating system 230. VoIP call module 210 may comprise computer program instructions for connecting to VoIP conversations and for receiving and transmitting VoIP messages.

VoIP permission requestor 215 may comprise computer program instructions for checking for permission to record VoIP messages and for receiving responses to requests for permission. VoIP permission dispenser 220 may comprise computer program instructions for responding to requests for permission to record VoIP messages and for withdrawing grants of permission previously given. VoIP storage module 225 may comprise computer program instructions for checking for permission to record VoIP messages and for recording VoIP messages. VoIP storage module 225 may receive from permission requestor 215 the results of requests for permission to record VoIP messages, may determine that permission to record VoIP messages has been granted, and may store the VoIP messages. The VoIP messages may be stored in RAM 205, in non-volatile memory 240, or in removable drives or media not shown. VoIP storage module 225 may refuse requests to store VoIP messages for which permission to record has not been granted.

Operating system 230 may comprise UNIX™, Linux™, Microsoft Windows™, AIX™, IBM's i5/OS™, or other operating systems useful for checking for permission to record VoIP messages as will occur to those of skill in the art. VoIP call module 210, permission requester 215, permission dispenser 220, VoIP storage module 225, and operating system 230 are shown in RAM 110 in FIG. 1, but many components of such software may be stored in non-volatile memory 240 also. Further, while the components of such are shown simultaneously present in RAM, in other embodiments, only some of the components of RAM 205 may be present at any given time.

Non-volatile computer memory 240 may be implemented as a hard disk drive 245, optical disk drive 250, electrically erasable programmable read-only memory space (EEPROM or Flash memory) 255, RAM drives (not shown), or as any other kind of computer memory as will occur to those of skill in the art. Communications adapter 260 may implement the hardware level of data communications through which one computer sends data communications to other computers, such as other computers 265, directly or through a network. Such data communications may be carried out through serially through RS-232 connections, through external buses such as USB, through data communications networks such as IP networks, and in other ways as will occur to those of skill in the art. Examples of communications adapters useful for useful for checking for permission to record VoIP messages as will occur to those of skill in the art include modems for wired dial-up communications, Ethernet (IEEE 802.3) adapters for wired network communications, and 802.11b adapters for wireless network communications.

I/O interface adapter 270 implements user-oriented I/O through, for example, software drivers and computer hardware for controlling output to display devices such as display device 280 and audio output device 285 as well as user input from user input device 290 and audio input device 295. Audio output device 285 may play VoIP messages and audio input device 295 may receive sounds to be transmitted as VoIP messages. User input device 290 may include both a keyboard and a mouse. Some embodiments may include other user input devices such as speech interpreters, bar code scanners, text scanners, tablets, touch screens, and/or other forms of user input devices. Audio output device 285 may include speakers or headphones and audio input device 295 may include a microphone or other device to capture sound.

The computer and components illustrated in FIG. 2 are for explanation, not for limitation. In some other embodiments, embedded systems, PDAs, cell phones, and other network-enabled devices which may transmit, receive, and store VoIP messages may check for permission to record VoIP messages, may respond to requests, and may require permission before storing VoIP messages. In many other embodiments, the VoIP call module, the permission requestor, permission dispenser, and VoIP storage module may be implemented in hardware, firmware, or in state machines or may form a component of an operating system. In several other embodiments, the VoIP call module, the permission requester, permission dispenser, and VoIP storage module may be combined into fewer than four separate modules.

Figure 3:
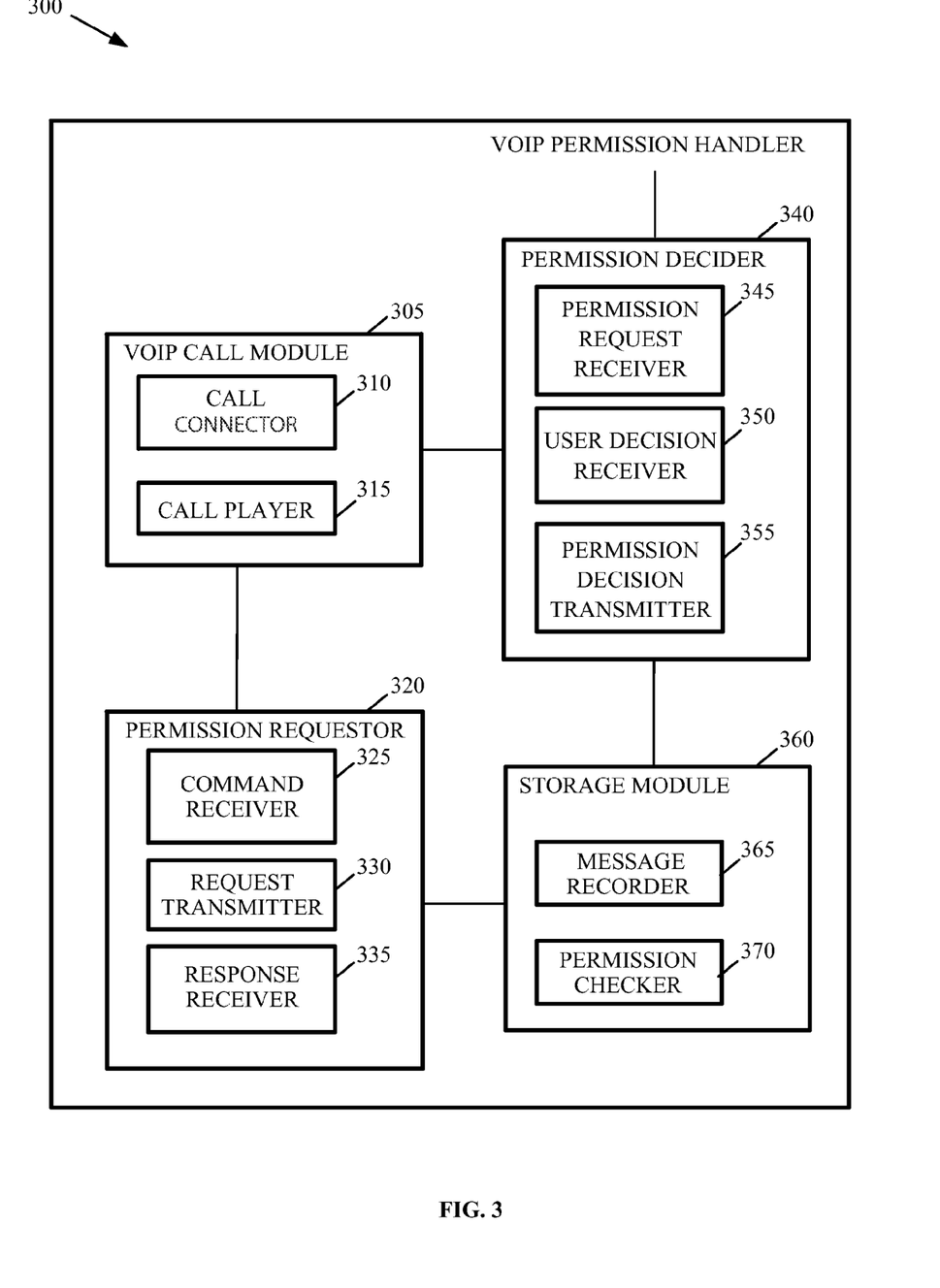
FIG. 3 depicts an embodiment of a VoIP permission checker.

Turning to FIG. 3, depicted is an embodiment of a VoIP permission handler 300 that includes a VoIP call module 305, a permission requester 320, a permission decider 340, and a storage module 360. The VoIP permission handler 300 is a control mechanism for checking for permission to record VoIP messages and for responding to requests for permission. VoIP permission handler 300 may inquire for permission to record VoIP messages, receive responses to the inquiries, respond to requests for permission, record VoIP messages for which grants of permission to record are obtained, and refrain from recording VoIP messages for which grants of permission are not obtained.

VoIP call module 305 is an apparatus for participating in VoIP conversations. The VoIP conversations may include VoIP conferences. VoIP call module 305 includes call connector 310 and call player 315. Call connector 310 may establish Internet connections to VoIP conversations, transmit VoIP messages from one participant to other participants in the VoIP conversations, and receive VoIP messages from the other participants. VoIP call player 315 plays VoIP calls, including calls received by call connector 310.

Permission requestor 320 is an apparatus for inquiring for permission to record VoIP messages and for receiving responses to the inquiries. Permission requestor 320 includes command receiver 325, request transmitter 330, and response receiver 335. Command receiver 325 may receive commands to check for permission to record VoIP messages. In some embodiments, the commands may consist of explicit commands to check for permission. In other embodiments, the commands may consist of commands to record VoIP messages. The commands may be received from a participant in a VoIP conversation through a user interface.

Request transmitter 330 may transmit inquiries for permission to record VoIP messages. In many embodiments, the inquiries may constitute requests for permission. In some embodiments, request transmitter 330 may transmit a request to record a VoIP message to the originator of the VoIP message. In other embodiments, request transmitter 330 may transmit the request of one participant in a VoIP call session to all of the other participants in the call. The requests may ask permission to record a specific VoIP message, all of the VoIP messages of a VoIP call session, or a specified group of VoIP messages of a VoIP call session.

Request transmitter 330 may transmit the requests in response to the receipt of commands from command receiver 325. In some embodiments, request transmitter 330 may also transmit requests to record VoIP messages without the receipt of commands. In further embodiments, for example, request transmitter 330 may transmit requests for permission to record VoIP messages at the start of each VoIP call session. The permissions are then available in case a participant later desires to record VoIP messages from the VoIP call session.

In many embodiments, request transmitter 330 may transmit inquiries for permission to record VoIP messages by transmitting an inquiry to a location or locations of rules or policies about permission to record. In further embodiments, participants in VoIP call sessions may enter preferences as to permission for recording VoIP messages, and the request transmitter 330 may check the permissions granted by the preferences. The request transmitter 330 may identify the parties to VoIP call sessions or determine the Internet addresses involved and examine the rules or policies associated with the parties or the Internet addresses. In some further embodiments, rules or policies may be established by methods other than user preference. A business may, for example, require the recording of periodic employee meetings. In some further embodiments, request transmitter 330 may check the rules or policies to investigate permission to record VoIP messages from VoIP call sessions that have ended.

Response receiver 335 may receive responses to inquiries for permission. The inquiries may include requests for permission. Request transmitter 335 and response receiver 340 may use the same Internet connections for transmitting inquiries for permission and receiving responses as used by call connector 310.

VoIP permission decider 340 is an apparatus for granting and refusing permission to record VoIP messages. VoIP permission decider 340 includes permission request receiver 345, user decision receiver 350, and permission decision transmitter 355. Permission request receiver 345 may receive requests for permission to record VoIP messages transmitted by modules similar to request transmitter 335. The requests for permission may pertain to specific VoIP messages or may pertain to all of the VoIP messages of a VoIP call. Permission request receiver 345 may present the requests for permission to a participant of a VoIP call.

User decision receiver 350 may receive grants and refusals of permission to record VoIP messages. The grants and refusals may be in response to requests for permission to record VoIP messages, such as requests for permission transmitted by request transmitter 330 and received by permission request receiver 345. The grants and refusals in response to a request for permission may apply to a single VoIP message, to all of the VoIP messages of a VoIP call session, or to a specified group of VoIP messages during a call session. For example, the response to a request for permission to record a single VoIP may apply to that single VoIP message. A response to a request for permission to record all of the VoIP messages of a VoIP call session may apply to all the messages, or may specify a subset. For example, a response to a request made after the transmission of several VoIP messages during a session may grant permission to record some, but not all, of the VoIP messages. The VoIP messages may be specified by the number of recent messages to include, by the time at which the VoIP messages were transmitted, or by other means of identifying the messages.

In some embodiments, the grants and refusals may retract permission to record previously given. A participant in a VoIP call may, for example, grant permission to record the VoIP messages of a VoIP call session, but may specify that a particular VoIP message is not to be recorded. In further embodiments, a participant may click on a privacy button to retract permission to record the participant's next voice message. The participant may then make a statement that is not recorded. In many embodiments, a participant in a VoIP call session who gave permission to record the VoIP messages of the VoIP call session may retract permission to record a specified group of the VoIP messages.

The grants and refusals may be in the form of preferences on permissions to record. A participant may, for example, prefer to always allow recording or to always forbid recording VoIP messages. The preferences may be based upon the identity of the requestor. For example, a participant may always allow requests from some people to record VoIP messages, and may always deny requests from other people to record VoIP messages. Similarly, the preference may be based upon the setting of the VoIP calls. For example, a participant may grant permission to record VoIP messages made during recurring VoIP conference calls, such as a weekly meeting of a business group. In some embodiments, the VoIP permission handler 300 may notify the participant that a grant of permission to record based upon a preference has been given. In many embodiments, the VoIP permission handler 300 may verity that the participant in the VoIP conference is the same person who specified the preferences for permission to record. The VoIP permission handler 300 may, for example, require a login and password or other presentation of credentials of users.

In some embodiments, user decision receiver 350 may receive grants and refusals of permission to record VoIP messages through pop-up menus or other graphical interface features. For example, user decision receiver 350 may generate a pop-up menu or other graphical interface feature asking the participant for general preferences. User decision receiver 350 may also generate a pop-up window or other graphical interface feature when permission to record a VoIP message or messages is received and user preferences do not cover the request. User decision receiver 350 may also generate a pop-up menu or other graphical interface feature in response to user action. A participant in a VoIP conversation may, for example, override the participant's usual preferences by clicking a right mouse button. The participant may then indicate that the following VoIP message is to be private, denying permission to record the VoIP message, despite a usual preference to permit recording. In other embodiments, user decision receiver 350 may utilize other forms of user interface. A user decision receiver 350 may, for example, use speech recognition software to interpret a participant's speech or may receive text from a participant.

VoIP storage module 360 is an apparatus for controlling the recording of VoIP messages according to permission to record. VoIP storage module 360 may record VoIP messages for which permission to record has been granted and may refrain from recording VoIP messages for which permission to record has not been granted. VoIP storage module 360 includes message recorder 365 to record VoIP messages and permission checker 370 to check for permission to record VoIP messages. Message recorder 365 may receive requests to record VoIP messages. The request may be generated at the initiative of a participant in a VoIP conference. In some embodiments, for example, a participant may issue a command to record a particular VoIP message, all of the VoIP messages of a VoIP call session, or a specified group of VoIP messages from a VoIP call session. In other embodiments, VoIP permission handler 300 may prompt a participant for instructions about recording VoIP messages. For example, after each VoIP message, message recorder 365 may ask the participant whether to retain the VoIP message. In further embodiments, the default may be to delete a VoIP message. A VoIP message may be deleted unless message recorder 365 receives specific instructions to retain the VoIP message. In still other embodiments, message recorder 365 may automatically record all VoIP messages for which permission has been obtained without action on the part of a participant. Message recorder 365 may, for example, comprise a component of an archival mechanism.

VoIP message recorder 365 may check with permission checker 370 for permission to record VoIP messages. Permission checker 370 may in turn check with permission requester 320 for permission. If permission to record VoIP messages is available, message recorder 365 may record the VoIP messages by moving the VoIP messages from temporary buffers to permanent storage, such as storage in non-volatile memory. The recorded VoIP messages may be available for retrieval after the shutting down of applications controlling the VoIP call sessions during which the VoIP messages were produced. The recorded VoIP messages may also be available for retrieval after a powering down of the computer or other device used to participate in the VoIP call sessions.

Conversely, if permission to record VoIP messages is not available, message recorder 365 may refrain from complying with commands to record the messages. The VoIP messages may be deleted without being recorded. In some embodiments, for example, temporary storage such as buffers may be used to hold VoIP messages of a VoIP call session. In further embodiments, if permission to record VoIP messages is refused, VoIP message recorder 365 may delete the VoIP messages from temporary storage, either immediately or at the end of the VoIP call sessions during which the VoIP messages were generated. In other embodiments, VoIP message recorder 365 may overwrite the VoIP messages. In still other embodiments, VoIP messages in temporary storage may be held in difficult to read formats, such as encrypted formats or propriety compression formats. VoIP messages for which permission to record is lacking may be kept in these difficult to read formats.

In some embodiments, message recorder 365 may store data in addition to VoIP messages. For example, a message recorder 365 of a VoIP permission handler that participates in chat conferences with VoIP may store the chat messages as well as the VoIP messages transmitted during the chat conference. As another example, a message recorder 365 may store a log of VoIP messages. The log may indicate the topics of VoIP messages and their arrival time. The log may also include attributes of text VoIP messages or may include the actual text of the text VoIP messages. The log may include entries for VoIP messages that are deleted as well as entries for VoIP messages that are recorded. As another example, a message recorder 365 may store transcripts of VoIP messages. The transcripts may be produced by a recipient of the VoIP message.

FIG. 3 is for illustration and not limitation. Other embodiments may comprise different modules with different submodules. A VoIP permission handler may include a permission requester without a permission decider or a permission decider without a permission requestor. A permission checker may be in a separate module from a storage module. For example, a permission checker may directly receive commands to store VoIP calls and may forward the commands to a storage module only after confirming that permission is available.

Figure 4:
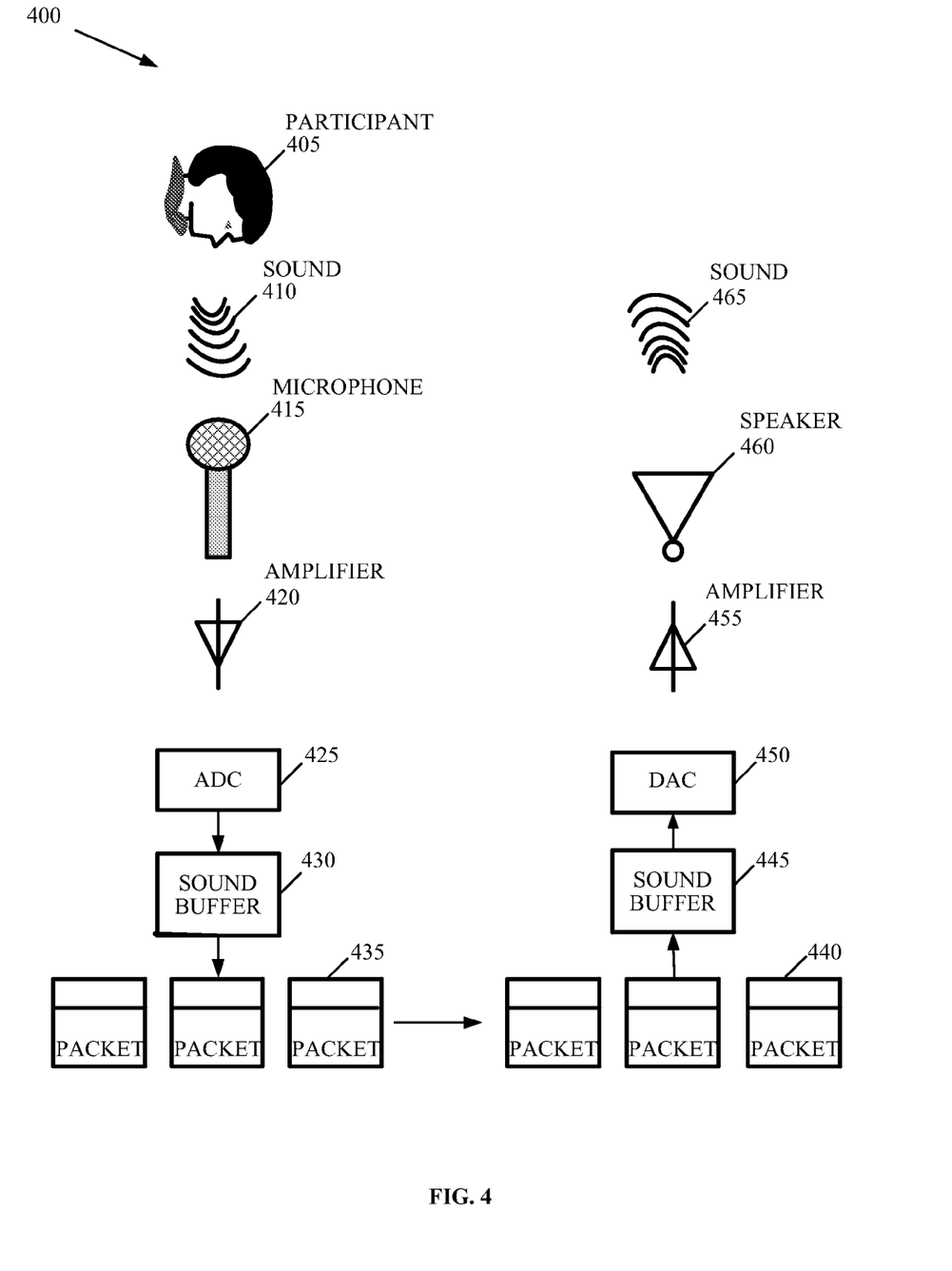
FIG. 4 depicts an embodiment of a system to transmit sound over a network.

FIG. 4 depicts an embodiment of a system 400 to transmit sound across a network. System 400 includes a microphone 415, two amplifiers 420 and 455, an analog to digital converter (ADC) 425, a digital to audio converter (DAC) 450, two sound buffers 430 and 445, and sound packets 435 and 440. A participant 405 in a VoIP call may produce sound 410, for example, by speaking. The sound may also be non-verbal. In alternative embodiments, the sound may be produced by an agency other than a participant, Microphone 415 may convert the sound waves constituting sound 410 into electrical signals. The sound waves may produce vibrations in a diaphragm, a thin plate contained in the microphone; and the vibrations of the diaphragm may induce electrical signals. In some embodiments, the microphone 415 may be a component of a VoIP device, such as a built-in microphone in a computer or a cell phone. In alternative embodiments, the microphone may plug into the VoIP device. For instance, a microphone jack may plug into a computer. Amplifier 420 boosts or increases the strength of the electrical signals produced by the microphone.

The signal then proceeds to an ADC 425, which converts the electrical waves to digital form. ADC 425 may measure the electrical signals produced by the microphone at a predetermined frequency ('sample' the signals), divide the amplitudes of the waves into ranges, and record the ranges. For example, an ADC that encodes the interval as an 8-bit number may divide the amplitude of waves into 256 ranges. For each sample, the ADC 425 may determine the range in which the wave amplitude falls. For example, an 8-bit ADC may find that successive amplitudes fall into the range of 128, 135, and 180 in successive samples. The ADC may return the numbers 128, 135, and 180 as the value of those samples. The sampling rate may depend upon the protocol used for the transmission of sound across a network. Common protocols include the G.711, G.722 and G.720 protocols, audio components of the H.323 protocol suite promulgated by the International Communication Union for video conferencing. Under the G.711 protocol, sampling occurs 64,000 times per second (64 kHz). Under the G.729A protocol, sampling occurs at 8 kHz. This protocol is the most commonly used by Voice over Internet Protocol (VoIP) systems. The sampling rate of 8 kHz provides a good compromise between sound quality and bandwidth efficiency. In contrast, typical CD recordings may sample at the rate of 44.1 kHz. A computer sound card may contain an ADC.

The sampling of the electrical signal produced by microphone 415 may generate a large amount of data. At a resolution of 16 bits and a sampling rate of 48 kHz, an ADC may produce roughly six megabytes of data per minute. The data produced by ADC 425 may be stored in sound buffer 430 for further processing. The data in sound buffer 430 may be transmitted across a network. The data may be transmitted uncompressed or may be compressed for more efficient transmission. Uncompressed sound data may be represented as WAV files. A WAV file may include a small header with information about size, sample rate, and other facts. The remainder of the file may consist of digital numbers representing the magnitude of the sound waves at the sampling points. Methods of compression include MPEG, layer three of a standard developed by the Moving Picture Experts Group for the compression of audio-digital information. Compression may reduce the size of data by a factor of 10 or more.

The data, compressed or not, is then divided into packets 435 or small pieces of information for transmission over the internet. The packets contain the actual sound data and other information, such as the source and destination internet addresses, information about the protocols being followed for transmission, information about the format of the sound data file, and information for reassembling the packets. In addition to H.323, other protocols commonly used for the transmission of audio include the Session Initiation Protocol, a protocol designed especially for VoIP, and Media Gateway Control Protocol. Other protocols can be used for transmitting VoIP calls. In particular, proprietary protocols may be used during VoIP conferences, since all participants may use the same conference software.

The packets 435 may be transmitted across the internet to a network device of a recipient. There, the packets may be converted to sound by a process which is roughly the reverse of the process of transforming sound into packets. The arriving packets 440 are stored in a sound buffer 445. The sound buffer 445 may gather packets until the entire data from a transmission has been collected. Alternatively, the sound buffer 445 may gather enough packets to produce sound for a certain duration, and then pass on the packets for transformation into sound and playing the sound while additional packets continue to gather. This process of playing a portion of the sound while packets containing other portions of the sound are still arriving is called "streaming." The data may be copied from sound buffer 445 to other storage. For example, VoIP messages may be moved from sound buffer 445 to more permanent storage for later retrieval. As a further example, a VoIP message relayed through a computer may be stored for later retrieval in the memory of the computer. System 400 may check for permission to record VoIP messages before retaining the VoIP messages in more permanent storage rather than in sound buffer 445.

The packets 440 are assembled into an uncompressed digital sound file and sent to the DAC converter 450, which converts the digital files into analog electrical waves. The waves are amplified by amplifier 455 and sent through speaker 460 to produce sound 465. If the fidelity of system 400 is good, sound 465 may be very similar to sound 410. Even in relatively low-fidelity systems, when sound 410 is speech, sound 465 may be recognizable as the speech that produced sound 410.

Figure 5:
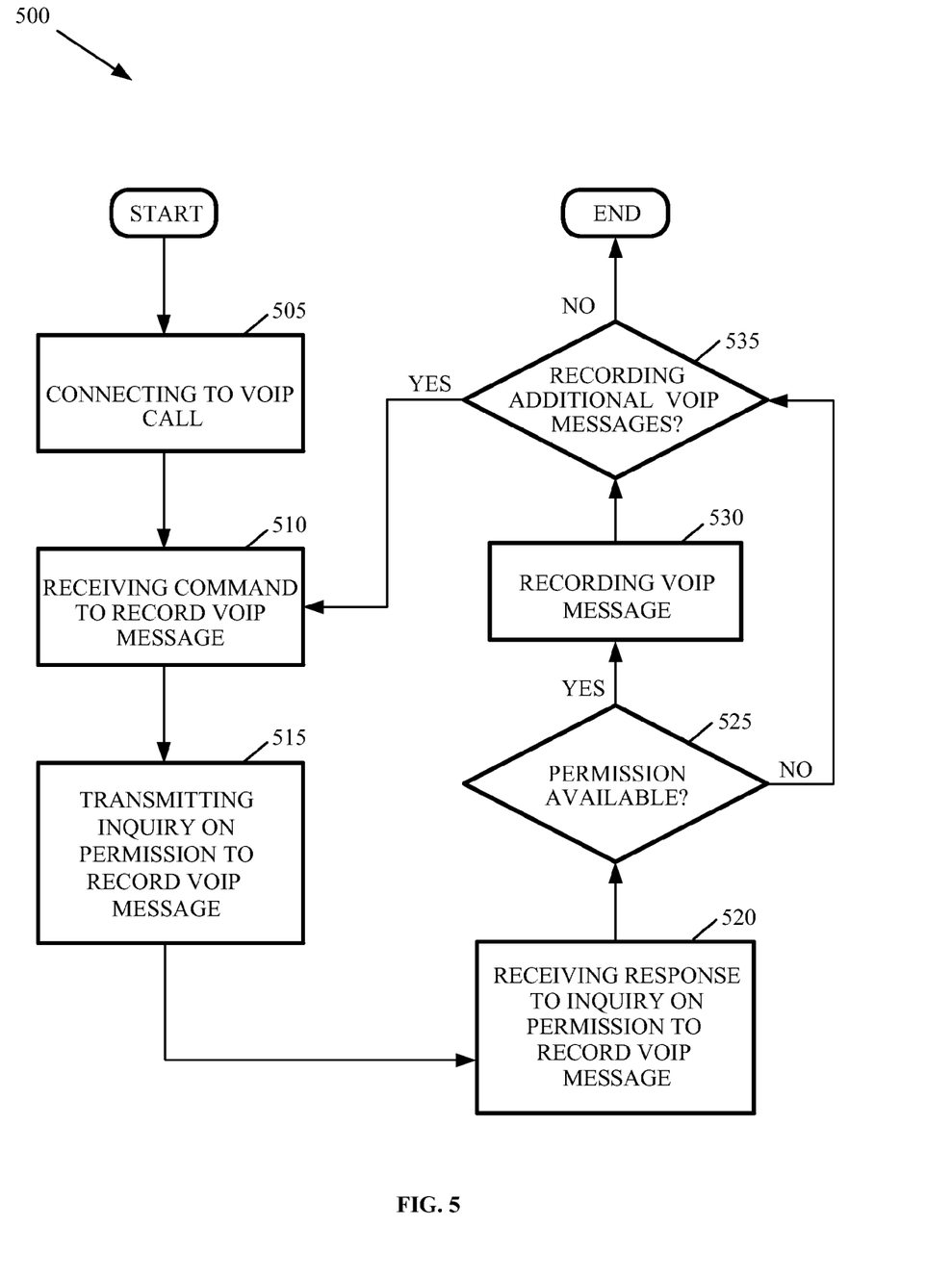
FIG. 5 depicts a flowchart of an embodiment to check for permission to record VoIP messages.

FIG. 5 depicts a flowchart of an embodiment to check for permission to record VoIP messages. Flowchart 500 of FIG. 5 includes connecting to a VoIP call (element 505). The VoIP call may be between two parties or may be a conference call of three or more parties. The VoIP call may be audio or may also include text VoIP messages. The method of FIG. 5 also includes receiving a command to record a VoIP message (element 510). In some embodiments, the command may be received immediately after the VoIP message is played or received. In several embodiments, the command may be received at the end of the VoIP call. In many embodiments, the command may be received after other VoIP messages are received but before the end of the VoIP call. A VoIP permission checker may provide a user an option of storing a VoIP message immediately after it has been played. VoIP messages not saved may be discarded immediately or at the end of a VoIP session. Alternatively, the apparatus may temporarily save all VoIP messages until the end of a session. The apparatus may then query a user as to which, if any, VoIP messages to store.

The method of FIG. 5 also includes transmitting an inquiry on permission to record a VoIP message (element 515). In some embodiments, transmitting the inquiry may consist of transmitting a request for permission to record the VoIP message. In many embodiments, transmitting the inquiry may consist of examining rules or policies on permission to record. The rules or policies may consist, for example, of user preferences or policies set by a corporate department. A VoIP permission requestor such as illustrated in FIG. 3 may be aware of the location of the participants in a VoIP call and may know which rules or policies to apply for each participant. In some further embodiments, the rules or policies may be stored on a central server. In other further embodiments, the rules or policies governing a participant may be stored on the devices used by participants in the VoIP calls, such as the devices illustrated in FIG. 1. In these embodiments, transmitting the inquiry may consist of transmitting an inquiry to the device used by the participant. The inquiry may be transmitted using the same network connection used to carry the VoIP call. The inquiry may be transmitted to a VoIP permission handler such as illustrated in FIG. 3. The method of FIG. 5 also includes receiving a response to the inquiry on permission to record the VoIP message (element 520). The response may be received using the same network connection used to carry the VoIP call.

If permission is available (element 525), the VoIP message may be recorded (element 530). In some embodiments, the recording may consist of moving the VoIP message from a temporary buffer to permanent storage such as non-volatile memory. In other embodiments, the recording may consist of enabling the longer-term storage of the VoIP message in its current storage location. For example, the storage area may be marked write-protected, so that subsequent incoming VoIP messages do not overwrite the VoIP message. In some embodiments, recording the VoIP message may also include making the VoIP message accessible to subsequent retrieval. For example, the VoIP message may be currently stored in a format that makes retrieval difficult, such as a compressed format or encrypted format. In these embodiments, recording the VoIP message may include rewriting the form in which the VoIP message is stored. If permission to record is not granted, the VoIP message may not be placed in permanent storage. In some embodiments, the VoIP message may be deleted. The deletion may occur immediately after permission is refused or may occur at the end of the VoIP call. The deletion may constitute deleting the record of the file from the file system or may include actually overwriting the file or zeroing out the space used to store it. If there are additional VoIP messages to receive (element 535), each element of flowchart 500 from element 510 to element 530 may be repeated. Otherwise, the requesting of permission to record VoIP messages may end.

Figure 6:
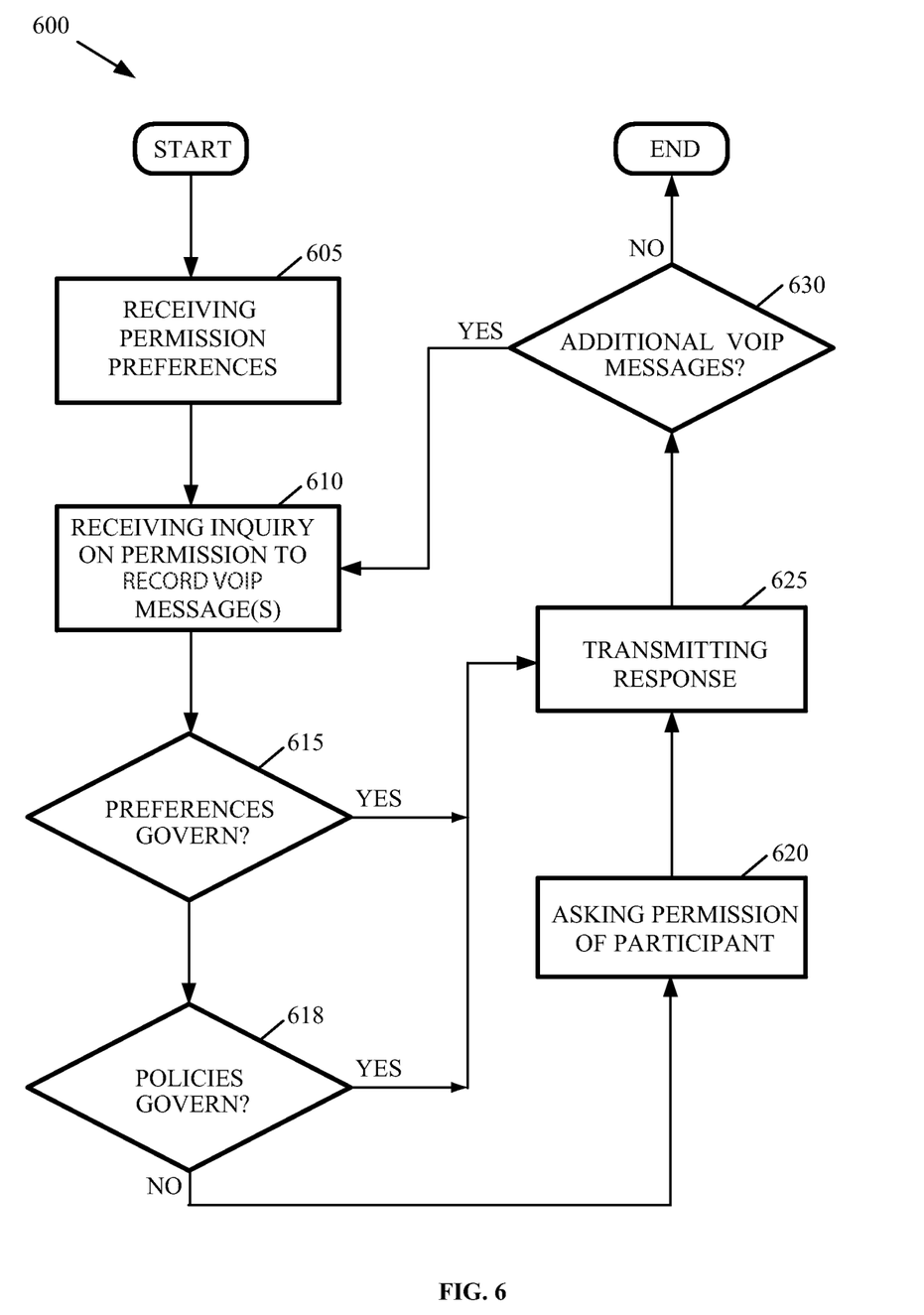
FIG. 6 depicts a flowchart of an embodiment to respond to inquiries for permission to record VoIP messages.

FIG. 6 depicts a flowchart of an embodiment to respond to inquiries on permission to record VoIP messages. Flowchart 600 begins with receiving preferences about granting permission to record VoIP calls (element 605). The preferences may be very general, such as always allowing the recording of VoIP calls or never allowing the recording of VoIP calls. Alternatively, the preferences may depend upon factors such as the identity of the requestor, the subject of the call, or, for conference calls, an identity of the conference. In some embodiments, default preferences may be used in the absence of receiving preferences from a participant. In other embodiments, default preferences may not be used. The method of FIG. 6 also includes receiving a request for permission to record a VoIP message or messages (element 610). The request may be received through the same network connection used to carry on the VoIP call during which the message was generated. The request may designate a single VoIP message from a VoIP call session, a group of VoIP messages, or all of the messages from the VoIP call session.

The request may be matched with the preferences about granting permission (element 615) to determine whether preferences are available and govern. The preferences may not govern. For example, the participant may allow requests from certain participants, and the received request may be from a participant not listed. As another example, the participant may not have entered preferences and default preferences may not be available. If the preferences do not govern, the method of FIG. 6 may include checking for policies governing permission to record a VoIP message, such as policies established by a corporate information technology department (element 618). If policies are not available or do not govern, the method of FIG. 6 may include checking for permission of a participant (element 620). A pop-up window may be generated to receive input from the participant. After a response to the inquiry on permission has been obtained, either from application of preferences or policies or from querying a participant, a response may be transmitted (element 625), either granting or denying permission to record the VoIP message or messages. The response may be a blanket grant or denial of permission to record all of the VoIP messages included in the request. Alternatively, if the request included multiple messages, the response may grant permission only to a subset of the VoIP messages. If there are additional requests for permission to record VoIP messages (element 630), each element of flowchart 600 from element 610 to element 625 may be repeated. Otherwise, the requesting of permission to record VoIP messages may end.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for checking for permission to record VoIP messages accessible from a computer-usable or computer-readable medium providing program code for use by or in connection with a computer or any instruction execution system. For the purposes of this description, a computer-usable or computer readable storage device can be any apparatus that can store the program for use by or in connection with the instruction execution system, apparatus, or device.

The storage device can be an electronic, magnetic, optical, electromagnetic, infrared, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements to check for permission to record Voice over Internet Protocol (VoIP) messages and to respond to requests for permission. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to check for permission to record Voice over Internet Protocol (VoIP) messages, the method comprising:
    a computer receiving a VoIP message of a participant in a VoIP call session;
    after the computer receiving the VoIP message of the participant in the VoIP call session, the computer automatically transmitting an inquiry on permission to record the VoIP message in response to receiving a command to record the VoIP message at the end of the VoIP call session;
    the computer receiving a response to the inquiry;
    the computer determining that the response to the inquiry grants permission of the participant to record the VoIP message; and
    in response to the computer determining that the response to the inquiry grants permission of the participant to record the VoIP message, the computer recording the VoIP message.

2. The method of claim 1, wherein:
    the computer transmitting the inquiry on permission to record the VoIP message of the participant in the VoIP call session comprises the computer transmitting a request for permission to record the VoIP message;
    the computer receiving the response to the inquiry comprises the computer receiving a response to the request;
    the computer determining that the response to the inquiry grants permission of the participant to record the VoIP message comprises the computer determining that the response to the request grants permission to record the VoIP message; and
    the computer recording the VoIP message comprises the computer recording the VoIP message in response to determining that the response to the request grants permission to record the VoIP message.

3. The method of claim 1, wherein:
    rules on permission to record apply to the VoIP message of the participant in the VoIP call session;
    the computer transmitting the inquiry on permission to record the VoIP message of the participant in the VoIP call session comprises the computer transmitting an inquiry to examine the rules on permission to record; and
    the computer determining that the response to the inquiry grants permission of the participant to record the VoIP message comprises the computer determining based upon the rules on permission.

4. The method of claim 1, wherein:
    the computer transmitting the inquiry on permission to record the VoIP message of the participant in the VoIP call session comprises:
    the computer examining a preference of a second participant on permission to record;
    the computer determining that the preference is not applicable to determining permission to record the VoIP message;
    the computer examining a business rule or a business policy governing the recording of VoIP messages; and
    the computer determining that the response to the inquiry grants permission to record the VoIP message comprises the computer determining that the response to the inquiry grants permission to record the VoIP message based upon the business rule or the business policy.

5. The method of claim 1, further comprising:
the computer receiving an indication of withdrawal of the permission granted to the participant to record the VoIP message; and
in response to receiving the indication of withdrawal, the computer deleting the recorded VoIP message.

6. The method of claim 1, further comprising:
in response to the computer receiving the VoIP message of the participant in the VoIP call session, the computer storing the VoIP message in a volatile memory; and
wherein the computer recording the VoIP message comprises the computer moving the VoIP message from the volatile memory to a non-volatile memory.

7. The method of claim 1, further comprising:
in response to the computer receiving the VoIP message of the participant in the VoIP call session, the computer storing the VoIP message in a storage location; and
wherein the computer recording the VoIP message comprises the computer marking the storage location as write-protected.

8. The method of claim 1, further comprising:
in response to the computer receiving the VoIP message of the participant in the VoIP call session, the computer storing the VoIP message in a format, wherein the format is selected from the group consisting of encrypted and compressed; and
wherein the computer recording the VoIP message comprises the computer rewriting the format.

9. A computer system comprising one or more processors, one or more computer-readable memories, one or more computer-readable tangible storage devices and program instructions which are stored on the one or more computer-readable tangible storage devices storage devices for execution by the one or more processors via the one or more computer-readable memories and when executed by the one or more processors perform the method of claim 1.

10. A computer program product comprising one or more computer-readable tangible storage devices and computer-readable program instructions which are stored on the one or more computer-readable tangible storage devices storage devices and when executed by one or more processors, perform the method of claim 1.

11. A computer system for checking for permission to record Voice over Internet Protocol (VoIP) messages, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to automatically transmit an inquiry for permission to record a VoIP message of a first participant in a VoIP call session in response to receiving a command to record the VoIP message at the end of the VoIP call session;
program instructions, stored on at least one of the one or more storage devices for execution by at least one of the one or more processors via at least one of the one or more memories, to receive a response to the inquiry for permission to record the VoIP message;
program instructions, stored on at least one of the one or more storage devices for execution by at least one of the one or more processors via at least one of the one or more memories, to determine whether the response to the inquiry to record the VoIP message grants permission to record the VoIP message;
program instructions, stored on at least one of the one or more storage devices for execution by at least one of the one or more processors via at least one of the one or more memories, responsive to determining that the response to the inquiry to record the VoIP message grants permission to record the VoIP message, to record the VoIP message; and
program instructions, stored on at least one of the one or more storage devices for execution by at least one of the one or more processors via at least one of the one or more memories, to store evidence of the permission granted to record the VoIP message.

12. The computer system of claim 11, further comprising:
program instructions, stored on at least one of the one or more storage devices for execution by at least one of the one or more processors via at least one of the one or more memories, to receive a request for permission of a second participant in the VoIP call session to record the VoIP message;
program instructions, stored on at least one of the one or more storage devices for execution by at least one of the one or more processors via at least one of the one or more memories, to query the second participant for permission to record the VoIP message through a user interface;
program instructions, stored on at least one of the one or more storage devices for execution by at least one of the one or more processors via at least one of the one or more memories, to receive a reply to the query from the second participant;
program instructions, stored on at least one of the one or more storage devices for execution by at least one of the one or more processors via at least one of the one or more memories, to generate a response to the request for permission to record the VoIP message based upon the reply from the second participant; and
program instructions, stored on at least one of the one or more storage devices for execution by at least one of the one or more processors via at least one of the one or more memories, to transmit the response.

13. The computer system of claim 11, wherein the program instructions to transmit the inquiry on permission to record the VoIP message of the first participant transmit the inquiry at the start of the VoIP call session.

14. The computer system of claim 11, wherein:
the VoIP call session comprises a chat conference with VoIP; and
the program instructions to record the VoIP message store a chat message of the chat conference and a log of the VoIP message.

* * * * *